United States Patent Office 2,767,179
Patented Oct. 16, 1956

2,767,179

QUATERNARY AMMONIUM SALTS OF CARBOLINE DERIVATIVES

Chester John Cavallito, Allan Poe Gray, and Ernest Elliott Spinner, Decatur, Ill., assignors to Irwin, Neisler and Company, Decatur, Ill., a corporation of Illinois No Drawing. Application February 12, 1954, Serial No. 410,046

6 Claims. (Cl. 260—247.5)

This invention relates to certain new and novel organic compounds and is more particularly concerned with organic compounds having the formula:

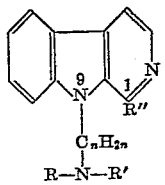

wherein $n$ is an integer from two to ten, inclusive, and wherein R and R' are lower-alkyl radicals which may be the same or different, or joined together to form a heterocyclic ring, and wherein R" is hydrogen or lower-alkyl. It is also envisioned that the present invention includes acid addition and quaternary ammonium salts, both mono- and di-, of the foregoing compounds.

The free bases of the present invention are high boiling liquids or low melting solids only slightly soluble in water. The acid addition salts and quaternary ammonium salts thereof are crystalline solids having a high melting point and are soluble in water. The compounds of the present invention have indicated utility as hypotensive agents in preliminary pharmacological studies.

The free bases of the present invention may be readily prepared by first providing a sodium, lithium, or potassium derivative of harman or norharman. Thus, harman, norharman, or an appropriate lower-alkyl derivative of norharman containing the lower-alkyl group in the 1-position, is reacted with sodamide, potassamide, sodium or lithium, sodium hydride, et cetera, to prepare a highly reactive intermediate addition product containing an alkali metal in the 9-position. This reaction may be carried out in the presence of a dry solvent such as, for example, ether, liquid ammonia, benzene, toluene, xylene, tetralin, et cetera, provided in every instance that the reaction is in a substantially anhydrous condition. The reaction is usually carried out by contacting the two materials with stirring for a period of time sufficient to cause reaction of substantially all the organic material which may be employed. In some cases higher temperatures may be employed to hasten the reaction if desired.

This intermediate, preferably without separation from the solvent, is then contacted with an appropriate basic alkyl halide, such as, for example, dimethylaminopropylchloride, diethylaminopropylchloride, dibutylaminopropylchloride, dihexylaminopropylchloride, dimethylaminodecylbromide, dimethylaminononyliodide, diethylaminohexyliodide, pyrrolidinopropylbromide, piperidinopropylbromide, morpholinoethyliodide, and ring-alkyl substituted derivatives of the foregoing, et cetera, that is, a dialkylaminoalkyl halide material which will then react with the metallic derivative of the carboline to prepare the bases of the present invention. The reaction will usually occur upon contact of the reactants, an elevated temperature will hasten the reaction in most cases, depending on the solvent employed, et cetera. Recovery of the reaction product may be accomplished in conventional manner.

Acid addition salts of the bases of the present invention may be readily prepared by contacting a solvent solution of the base with an appropriate acid, such as, for example, hydrogen chloride, hydrogen bromide, citric acid, tartaric acid, sulfuric acid, nitric acid, et cetera. Representative solvents which are suitable, include, for example, ether, dioxane, benzene, chloroform, and lower alkanols, such as, for example, methanol, ethanol, propanol, et cetera. The acid addition salt may be precipitated from the solvent mixture and recovered in conventional manner. Quaternary ammonium salts of the bases of the present invention may be readily prepared by reacting an appropriate quaternizing compound, such as, for example, methyl iodide, ethyl bromide, dimethyl sulfate, methyl toluene sulfonate, benzyl chloride, propyl chloride, propyl bromide, et cetera, in a manner similar to that described for the acid addition salt preparation.

The following examples are illustrative of the methods and compounds of the present invention, but are not to be construed as limiting.

Example 1

To a slurry of 8.4 grams (0.05 mole) of norharman in 100 milliliters of dry toluene was added 1.99 grams (0.051 mole) of sodamide. This mixture was stirred and heated at ninety degrees centigrade for two hours, in the course of which time 65 percent of the calculated amount of ammonia was evolved. A solution of 6.02 grams (0.0495 mole) of dimethylaminopropylchloride in twenty milliliters of dry toluene was then added dropwise, stirring was continued and the mixture heated on the steam bath for an additional five hours. The reaction mixture was cooled to room temperature, water added cautiously to decompose any excess sodamide and the toluene layer separated, washed with water and extracted with dilute sulfuric acid. The acid extract was made strongly alkaline and the product taken into ether. Drying over sodium sulfate, removal of the ether and distilling of the residual oil yielded 5.55 grams (44.5 percent of the theoretical yield) of 9-(3-dimethylaminopropyl)-9-pyrid-3,4b-indole, boiling at 169–172 degrees centigrade at 0.5 millimeter of mercury pressure, $n_D^{25}$, 1.6323.

Analysis:
Calculated____ C, 75.85  H, 7.55  Basic N, 11.02
Found_____    76.24      7.52           10.45

Example 2

To a slurry of 7.28 grams (0.04 mole) of harman in 200 milliliters of dry xylene was added 1.58 grams (0.0404 mole) of sodamide, and the mixture stirred and refluxed in an oil bath. After thirteen hours, the oil bath was replaced by a steam bath, and 5.95 grams (0.0398 mole) of diethylaminopropylchloride in ten milliliters of dry xylene was added dropwise. Stirring was continued and the reaction mixture was heated on the steam bath for an additional three hours. After cooling to room temperature, the mixture was cautiously treated with water, the xylene layer separated and extracted with three percent sulfuric acid. The acid solution was made strongly basic and extracted with ether to give an organic layer with marked green fluorescence. This was again taken into dilute acid, the aqueous layer brought to a pH of about eight with potassium carbonate, and extracted with ether. The ethereal solution, which exhibited no green fluorescence, was washed with water, dried over sodium sulfate, evaporated and the thick oily residue distilled to yield 7.02 grams (sixty percent of the theoretical yield) of 9-(3-diethylaminopropyl)-1-methyl- 9-pyrid-3,4b-indole, which boiled at 167–170 degrees centigrade at 0.1 millimeter of mercury pressure.

Analysis:

| | C | H | N |
|---|---|---|---|
| Calculated | 77.24 | 8.53 | 14.23 |
| Found | 77.14 | 8.75 | 13.92 |

*Example 3*

An ether solution of 2.95 grams (0.01 mole) of the product described in Example 2 was acidified with ethereal hydrochloric acid and the precipitate collected. After several recrystallizations from methanol, a yield of 1.58 grams of 9-(3-diethylaminopropyl)-1-methyl-9-pyrid-3,4b-indole dihydrochloride, melting with gas evolution, at 291 degrees centigrade, was obtained.

Analysis:

| | C | H | Cl |
|---|---|---|---|
| Calculated | 61.95 | 7.39 | 19.25 |
| Found | 61.58 | 7.04 | 18.50 |

*Example 4*

To 2.95 grams (0.01 mole) of the product described in Example 2, dissolved in 25 milliliters of acetonitrile was added 8.52 grams (0.06 mole) of methyl iodide. A precipitate began to form rapidly on refluxing the solution. After one hour the precipitate was collected and recrystallized twice from ethanol to give 3.52 grams of 9 - (3 - diethylaminopropyl)-1-methyl-9-pyrid-3,4b-indole dimethiodide, which melted with evolution of gas at 254 degrees centigrade.

Analysis:

| | C | H |
|---|---|---|
| Calculated | 43.54 | 5.39 |
| Found | 43.62 | 5.66 |

*Example 5*

A mixture of 8.4 grams (0.05 mole) of norharman and 2.0 grams (0.051 mole) of sodamide in 350 milliliters of dry xylene was stirred and refluxed for three hours until the evolution of ammonia had ceased. Stirring was continued, 13.5 grams (0.075 mole) of N,N-dimethylpyrrolidinium bromide added, and the mixture was refluxed for an additional twenty hours. Water was added to the cooled reaction mixture and 4.8 grams of a precipitate of norharman, melting point 197–199 degrees centigrade, was separated off. The xylene solution was extracted with dilute acid, the aqueous layer brought to pH 8–9 with sodium carbonate and extracted with ether. Removal of the ether and distillation afforded 1.1 grams of 9-(4-dimethylaminobutyl)-9-pyrid-3,4b-indole, boiling point 162–165 degrees centigrade, at 0.1 millimeter of mercury pressure absolute.

This material was refluxed in ethanol solution with five milliliters of methyl iodide for one hour. The precipitate which formed was collected and recrystallized several times from methanol to yield 1.1 grams of 9-(4-dimethylaminobutyl)-9-pyrid-3,4b - indole dimethiodide, melting with gas evolution at 257–260 degrees centigrade.

Analysis:

| | C | H | I |
|---|---|---|---|
| Calculated | 41.39 | 4.94 | 46.05 |
| Found | 41.77 | 4.74 | 45.32 |

The following table comprises data obtained for compounds prepared by the methods of the foregoing examples.

| No. | Name | Physical Properties | Analyses Calc'd | Analyses Found |
|---|---|---|---|---|
| 6 | 9-(2-Diethylaminoethyl)-9-pyrid-3,4b-indole | B. P. 167–174, 0.8 mm, $n_D^{23}$ 1.6098. | N, 10.48 (basic) | N, 9.73 (basic). |
| 7 | 9-(2-Diethylaminoethyl)-1-methyl-9-pyrid-3,4b-indole | B. P. 155–157, 0.5 mm | | |
| 8 | 9-(2-Dimethylaminoethyl)-1-methyl-9-pyrid-3,4b-indole | B. P. 184–187, 0.6 mm., M. P. 74–76. | C, 75.85; H, 7.56; N, 16.59. | C, 76.15; H, 7.44; N 16.76. |
| | | M. P., °C. | | |
| 9 | 9-(2-Dimethylaminoethyl)-1-methyl-9-pyrid-3,4b-indole dimethiodide. | 289–291 (gas evol.) | C, 40.24; H, 4.69; Halo, 47.25. | C, 40.10; H, 4.95; Halo, 47.56. |
| 10 | 9-(2-Diethylaminoethyl)-9-pyrid-3,4b-indole dihydrochloride | 239–241 | C, 60.00; H, 6.81; Halo, 20.84. | C, 59.73; H, 7.09; Halo, 20.19. |
| 11 | 9-(2-Diethylaminoethyl)-9-pyrid-3,4b-indole dimethiodide | Gas evol. above 256 | C, 41.39; H, 4.94; Halo, 46.05. | C, 40.52; H, 5.27; Halo, 45.61. |
| 12 | 9-(2-Diethylaminoethyl)-1-methyl-9-pyrid-3,4b-indole dihydrochloride. | 267–270 (gas evol.) | C, 61.01; H, 7.11; Halo, 20.01. | C, 61.32; H, 6.77; Halo, 19.73. |
| 13 | 9-(2-Diethylaminoethyl)-1-methyl-9-pyrid-3,4b-indole dimethiodide. | 256–258 | | |
| 14 | 9-(3-Dimethylaminopropyl)-9-pyrid-3,4b-indole dihydrochloride. | 278–279 | Halo, 21.73 | Halo, 20.99. |
| 15 | 9-(3-Dimethylaminopropyl)-9-pyrid-3,4b-indole dimethiodide | 270–273 (gas evol.) | C, 40.24; H, 4.69; Halo, 47.25. | C, 39.46; H, 5.15; Halo, 46.91. |

Various modifications may be made in the present invention without departing from the spirit or scope thereof, and it is to be understood that we limit ourselves only as defined in the appended claims.

We claim:

1. A compound selected from the group consisting of (A) those having the formula:

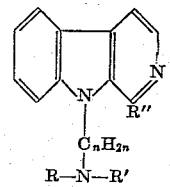

wherein $n$ is an integer from two to ten, inclusive, wherein R and R' are lower-alkyl radicals which may be the same or different, or joined together to form a heterocyclic ring selected from the group consisting of pyrrolidinio, piperidinio and morpholinio, and wherein R'' is selected from the group consisting of hydrogen and lower-alkyl, and (B) acid addition and quaternary ammonium salts of (A).

2. 9 - (3 - diethylaminopropyl)-1-methyl-9-pyrid-3,4b-indole dihydrochloride.

3. 9 - (2 - dimethylaminoethyl)-1-methyl-9-pyrid-3,4b-indole.

4. 9-(2-diethylaminoethyl)-9-pyrid-3,4b-indole dihydrochloride.

5. 9 - (2 - diethylaminoethyl) - 1-methyl-9-pyrid-3,4b-indole dihydrochloride.

6. 9-(3-dimethylaminopropyl)-9-pyrid-3,4b-indole dihydrochloride.

References Cited in the file of this patent

UNITED STATES PATENTS

| 2,642,438 | Duschinsky | June 16, 1953 |
| 2,688,022 | Burtner | Aug. 31, 1954 |